United States Patent [19]

Ishida et al.

[11] Patent Number: 4,720,725
[45] Date of Patent: Jan. 19, 1988

[54] FLASHMATIC DEVICE FOR CAMERAS

[75] Inventors: Hiroaki Ishida; Shinji Nagaoka, both of Yotsukaido, Japan

[73] Assignee: Seikosha Co., Ltd., Tokyo, Japan

[21] Appl. No.: 873,128

[22] Filed: Jun. 13, 1986

Related U.S. Application Data

[63] Continuation of Ser. No. 646,365, Aug. 30, 1984, abandoned.

[30] Foreign Application Priority Data

Aug. 31, 1983 [JP] Japan ................... 58-160697

[51] Int. Cl.$^4$ ............................................. G03B 15/05
[52] U.S. Cl. ...................................... 354/414; 354/421; 354/129; 354/137; 354/127.1
[58] Field of Search ............... 354/413, 414, 420, 421, 354/422, 423, 435, 436, 437, 126, 129, 137

[56] References Cited

U.S. PATENT DOCUMENTS

| | | | |
|---|---|---|---|
| 3,690,237 | 9/1972 | Fuwa | 354/137 |
| 4,063,257 | 12/1977 | Mashimo et al. | 354/414 |
| 4,065,776 | 12/1977 | Iwata et al. | 354/437 |
| 4,174,161 | 11/1979 | Mashimo et al. | 354/414 |
| 4,255,030 | 3/1981 | Johnson et al. | 354/436 |
| 4,305,647 | 12/1981 | Ishida | 354/423 |
| 4,307,949 | 12/1981 | Takazawa et al. | 354/421 |
| 4,346,971 | 8/1982 | Johnson et al. | 354/436 |
| 4,466,727 | 8/1984 | Nogaoka et al. | 354/417 |

FOREIGN PATENT DOCUMENTS 0054777 of 0000 Japan.

Primary Examiner—Russell E. Adams
Attorney, Agent, or Firm—Bruce L. Adams; Van C. Wilks

[57] ABSTRACT

A flashmatic device for cameras equipped with a programmed electronic shutter having sectors serving also as diaphragm blades, firing the flash at a suitable point in a phase of the shutter operation in which the aperture is gradually opened, to ensure synchronized flash shooting. Even in a case where a sector closing signal is produced earlier than a flash trigger signal, the flash is fired by means of a switch which is closed in relation with the sector closing motion to make flash synchronization possible under any condition.

14 Claims, 7 Drawing Figures

FLASHMATIC DEVICE FOR CAMERAS

This is a continuation of application Ser. No. 646,365, filed Aug. 30, 1984, now abandoned.

BACKGROUND OF THE INVENTION

Field of the Invention

This invention relates to a flashmatic device for photographic programmed shutters having sectors which serve also as diaphragm blades.

Especially in the case of a camera with a built-in flash device (hereinafter referred to simply as "flash" for brevity), the flash is often used even in daylight as corrective lighting for a back-lighted subject or as an auxiliary illumination source. There have thus far been made various proposals with regard to daylight flashmatic shooting (hereinafter referred to as "daylight synchronizaiton") by programmed shutters to which the present invention is directed, namely, programmed shutters of the type in which sectors serving also as diaphragm blades are gradually opened with the lapse of time. One effective method is disclosed in Japanese Patent Publication No. 57-54777, in which the flash is triggered and fired at a time point when the opening shutter blades reach a diaphragm setting suitable for flashmatic shooting according to the subject in the course of opening the aperture. According to this patent publication, a first electronic signal is produced during a time period in which the gradually opened shutter reaches the diaphragm setting as determined according to the distance to the subject, triggering the flash by the first electric signal or a second shutter closing electric signal whichever is produced earlier. However, actually the shutter begins to close with a time delay of several ms from the time point at which the shutter closing signal is produced, so that in the case of shooting in daylight the second electric signal is produced considerably earlier than the time point when the maximum aperture is reached, failing to synchronize the flash. There is also a possiblity of firing the flash prematurely before the shutter begins to open, under paticular conditions, for example, when shooting a back-lighted figure beside a window.

SUMMARY OF THE INVENTION

It is therefore a primary object of the present invention to provide a flashmatic device which can synchronize the flash with the opening and closing of a shutter under any shooting condition thereby ensuring appropriate synchronization even in daylight shooting.

It is another object of the invention to provide a flashmatic device which permits synchronized flash lighting in daylight shooting.

It is a further object of the invention to provide a flashmatic device including an indicator which indicates whether the flash firing is timed with a diaphragm setting according to the subject distance or the film sensitivity or with the maximum aperture of the shutter, attaching importance to the exposure by external light and regarding the flashlight as auxiliary lighting.

According to the present invention, there is provided a flashmatic device for cameras equipped with a programmed shutter having sectors serving also as diaphragm blades and adapted to open gradually with the lapse of time, characterized in that the flashmatic device comprises: a delay circuit adapted to start operation in synchronism with a start of a shutter opening action; a synchronous switch operated by a shutter closing member; and a switching element connected to the output of the delay circuit; the delay time of the delay circuit being determined by the subject distance, film sensitivity and intensity of light emission by a flash device, triggering the flash device by the output of the delay circuit or the output of the synchronous switch whichever is produced earlier.

The flashmatic device according to the present invention can be used very effectively for correction of couterlight or as auxiliary lighting in daylight synchronized shooting. Further, it is possible to indicate the corrective effect on the subject of the flashlight.

The above and other object, features and advantages of the present invention will become apparent from the following description and appended claims, taken in conjunction with the accompanying drawings which show by way of example some preferred embodiments of the invention.

DESCRIPTION OF PREFERRED EMBODIMENTS

Figure 1:
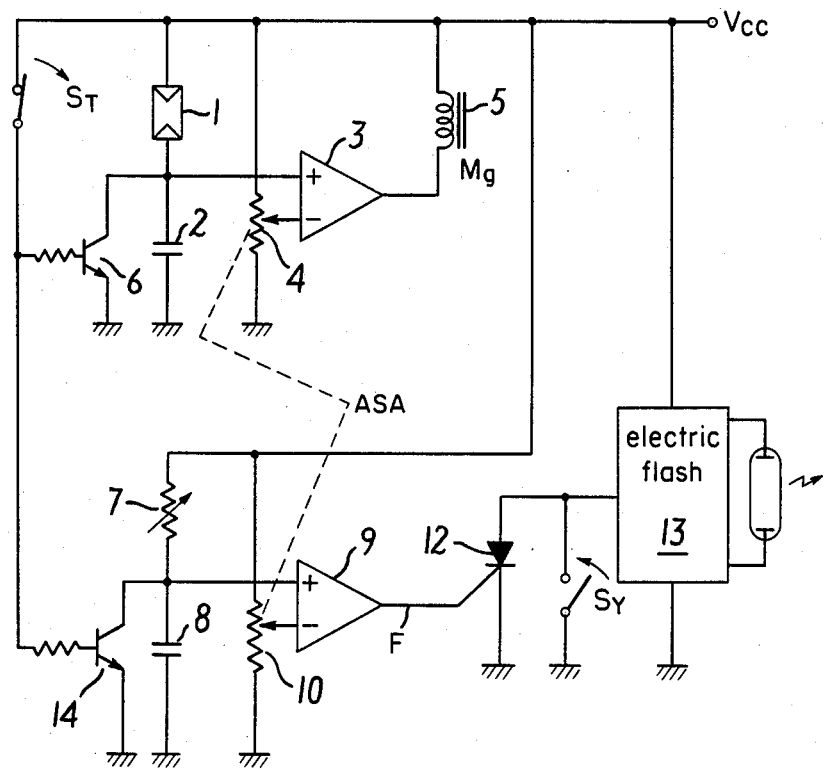
FIG. 1 is a circuit diagram of a flashmatic device embodying the present invention.

Referring first to FIG. 1, there is illustrated a circuit diagram of a flashmatic device according to the invention, in which indicated at 1 is a photoconductive element, and at 2 a time-controlling capacitor constituting a CR integrating circuit. At 3 is a voltage comparator, at 4 a variable resistor for determining the reference voltage for the comparator 3, at 5 an electromagnet for controlling the closing action of the shutter, and at 6 a transistor for producing a start signal for the integrating circuit. At 7 is a variable resistor for introducing the information with regard to the distance to subject, at 8 a time-controlling capacitor, at 9 a voltage comparator, and at 10 a variable resistor interlinked with the aforementioned variable resistor 4 and serving to introduce the information regarding the film sensitivity. At 12 is an SCR for producing a trigger signal to trigger a flash device 13 for a shot of lighting, and at 14 a transistor for controlling the start of an integrating circuit similarly to the transistor 6.

Figure 2:
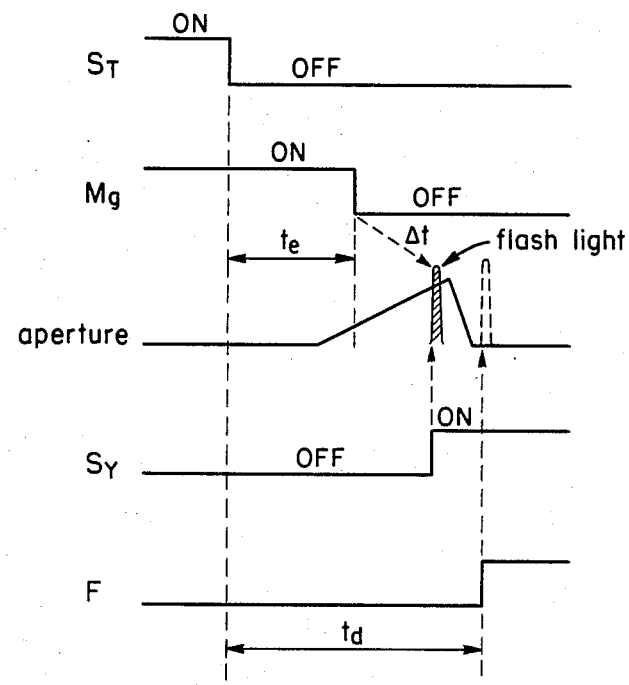
FIGS. 2 and 3 are diagrams explanatory of the operation performed by the circuit of FIG. 1.

Reference is had to FIG. 2 to explain the operation of the circuit shown in FIG. 1. In synchronism with the opening action of a shutter which is not shown, the timing switch ST which has been on is turned off, switching from on- to off-state the two transistors 6 and 14 which have their respective bases connected to the switch ST through a resistor. Whereupon, the first integrating circuit including the photoconductive element 1 and the second integrating circuit including the variable resistor 7 for the distance information are both actuated or enabled to start charging of the time-control capacitors 2 and 8. The reference input of the comparator 3 is set at a certain reference voltage level by the variable resistor 4, and, as soon as the charged voltage of the capacitor reaches the above-mentioned reference input voltage, the electromagnet 5 which is connected to the output terminal of the comparator 3 is switched from on- to off-state as indicated by Mg in FIG. 2. Namely, the time period from the turn-off of the timing switch ST to the turn-off of the electromagnet 5 corresponds to the exposure control time $t_e$ of the shutter. It is varied by the resistance value of the photoconductive element 1 to effect appropriate exposure according to luminosity.

Figure 3:
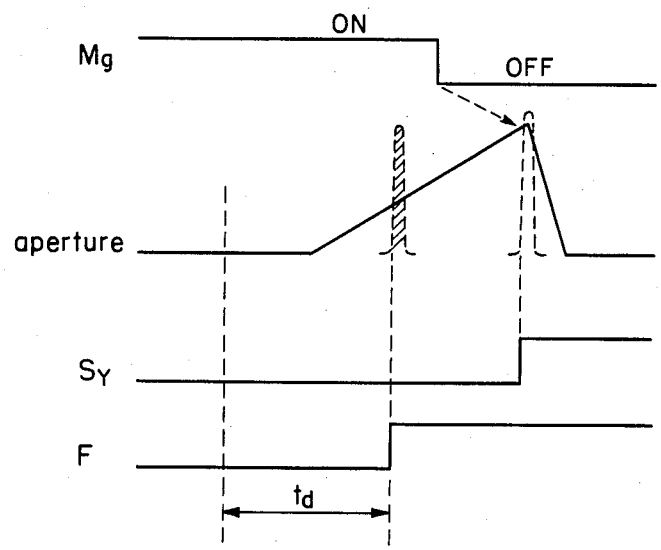

On the other hand, the second integrating circuit which operates in a similar manner turns its output level from "L" to "H" when the charged voltage of the capacitor 8 reaches the level of reference input voltage applied to the comparator 9 through the variable resistor 10. This operation controls the duration of the delay time $t_d$ which is variable depending upon the distance information given by the variable resistor 7. Further, the synchronous switch SY is turned on at the time when the electromagnet 5 is de-energized to start the closing action of the shutter. The output F of the comparator 9 is fed to the gate of the SCR 12, and the synchronous switch SY is connected in parallel with the SCR. Accordingly, the flash is fired by either the output F or the on-signal produced by the closing of the synchronous switch SY, whichever is produced earlier, in synchronism with both the opening and closing actions of the shutter. In a case where the subject is at a long distance, the delay time $t_d$ is extended as shown in FIG. 2, so that there is a possibility of the signal being produced after closing the shutter. Besides, if the flash is fired by an electric signal resulting from turn-off of the electromagnet, the aperture of the shutter is open only in a slight degree as shown, failing to obtain the effect of the flashlight. This is because there is a delay time $\Delta t$ between the turn-off of the electromagnet and the start of the shutter closing action. By the use of a synchronous switch of the construction as will be described hereinlater with reference to FIG. 6, it becomes possible to trigger and fire the flash always at a point close to the maximum aperture of the shutter to permit daylight synchronized shooting in an extremely effective manner. FIG. 3 shows an example of operation at a relatively low light level and a short object distance. In this case, the output signal F of the comparator 9 is produced in the course of the opening action of the shutter thereby turning on the SCR 12 to fire the flash. On the other hand, the shutter is closed only after appropriate exposure is obtained according to the luminosity of light from outside, so that it is possible to shoot flash pictures in daylight with correct exposure for both the main subject and the background.

Figure 4:
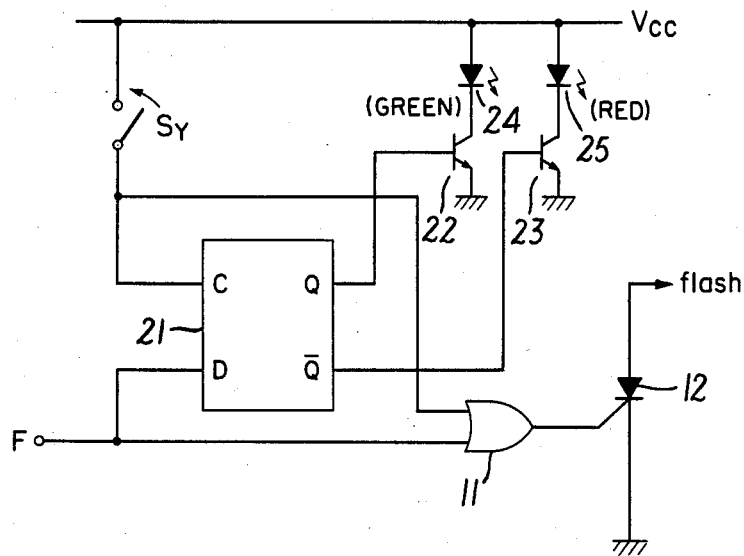
FIG. 4 is a circuit diagram of an indicator constituting part of the flashmatic device of the invention.
Figures 5A, 5B:
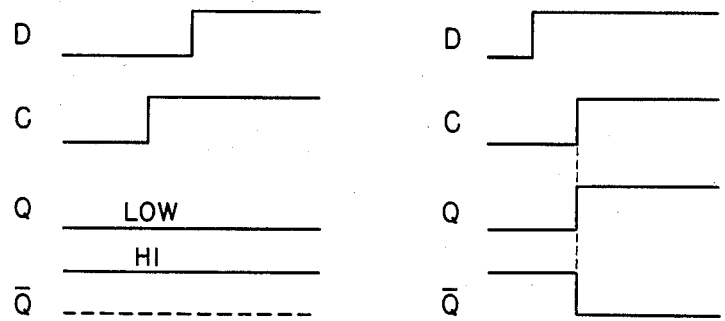
FIG. 5 is a diagram explanatory of the operation by the indicator of FIG. 4.

Illustrated in FIG. 4 is a circuit diagram of an indicator incorporated into the flashmatic device of the invention, in which the component parts labelled with reference numerals common to FIG. 1 have the same functions and wherein denoted at 11 is an OR gate, at 21 is a D flip-flop, and at 22 and 23 are transistors which have their respective bases connected to the Q- and $\overline{Q}$-outputs of the D flip-flop, respectively. The transistors 22 and 23 have their respective collectors connected to LEDs 24 and 25 which are preferred to be of green and red, respectively. Reference is now had to FIG. 5 to explain the operation of the indicator. FIG. 5(a) shows a case where the signal of the synchronous switch SY is produced before the signal F of the distance information as described hereinbefore in connection with FIG. 2. In this instance, the D-input is at "L" level when the C-input is supplied with the signal from the synchronous switch SY. The Q- and $\overline{Q}$-outputs remain at "L" and "H" levels, respectively, and the transistors 22 and 23 are in off- and on-states, respectively. Accordingly, the red LED 25 is lit as the shutter is operated. This is a case where the surroundings of the subject are bright enough and the subject distance is relatively long, indicating that the exposure is correct for the background but with a trend of underexposure for the subject. FIG. 5(b) shows a case where the signal F according to the distance information is produced earlier than the signal of the synchronous switch SY as explained hereinbefore in connection with FIG. 3. In this instance, the input terminal D is at "H" level when the signal is supplied to the input terminal C, so that the $\overline{Q}$-output is turned from "L" to "H" and the $\overline{Q}$-output is turned from "H" to "L". Accordingly, the red LED 25 is turned from on- to off-state, and the green LED from off- to on-state. This means that the exposure is appropriate for both the background and the subject. Although the description of the operation for setting and resetting the D flip-flop is omitted here, it is to be understood that the Q- and $\overline{Q}$-outputs are set respectively at "L" and "H" levels upon turning on a power switch. Preferably, the two LEDs 24 and 25 are turned on or off in response to a shutter operation end signal to prevent the on-off of the LED in the middle of the shutter operation as explained hereinbefore in connection with FIG. 5(b), for the purpose of facilitating eye observation of the indicated state.

Figure 6:
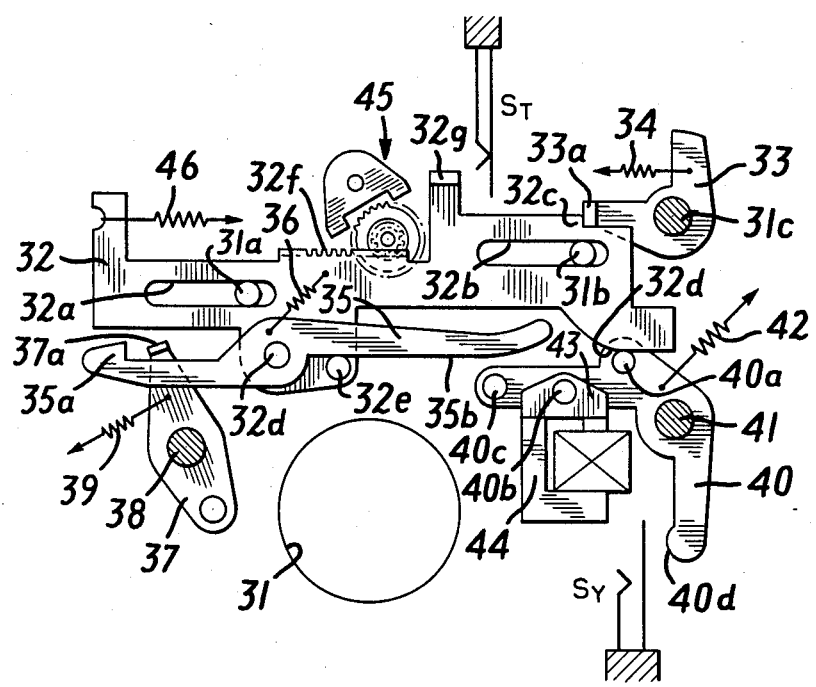
FIG. 6 is schematic view of a synchronous switch and its drive mechanism employed in the flashmatic device of the invention.

Referring to FIG. 6, there is shown an example of the synchronous switch and its drive mechanism suitable for the flashmatic device according to the invention, in which denoted at 31 is an opening in a base plate of the shutter which is omitted in FIG. 6 for the sake of simplicity of illustration. Designated at 32 is a drive or sector opening member of the shutter, which is provided with guide grooves 32a and 32b to receive pins 31a and 31b which are planted on the base plate. The reference numeral 33 denotes a stopper pawl which is biased by a spring 34 to turn counterclockwise about a pin 31c and provided with a right-angled bend 33a at the distal end, which is abuttingly engageable with a stepped portion 32c of the drive member 32 to hold same in a charged position against the action of a spring 46. Indicated at 35 is a release lever which is rotatable about a pin 32d planted on the drive member 32. The release lever 35 is biased to rotate clockwise by a spring 36 but its position is restricted by a pin 32e on the drive member 32. A sector to define an aperture and an exposure interval lever 37 which opens and closes the sectors, not shown, is rotatable about a pin 38 on the base plate 31, and biased to rotate counterclockwise by a spring 39 to hold the sectors in closed state. Designated at 40 is a magnet-operated lever which is rotatable about a pin 41 planted on the base plate 31 and biased to rotate clockwise by a spring 42. A pin 40a is which provided on the lever 40 is engaged with a cam surface 32d of the drive member 32 in such a manner as to block the clockwise rotation of the lever. A movable iron strip 43 is pivotally supported on the lever 40 by a pin 40b, and pressed against a magnet 44. Denoted at 45 is a governor unit which is in meshing engagement with a rack portion 32f of the drive member 32.

The reference characters ST and SY indicate the timing switch and synchronous switch, respectively.

In operation, if the circuit of FIG. 1 is connected to a power supply, the magnet 44 is energized and attracts the lever 40. Then, upon turning the stopper pawl 33 clockwise, the drive member 32 starts to move in the rightward directon by the action of the spring 46. As a result, a stepped portion 35a of the release lever 35 on the drive member 32 engages with a bent portion 37a of the lever 37, causing the latter to rotate clockwise against the action of spring 39 to open the sectors. Since the drive member 32 is moved at a low speed by the governor unit 45, the sectors tend to open slowly. At this time, the bent portion 32g of the drive member 32 turns off the timing switch ST to start the above-described operation. By this time the drive member 32 is in a position where its cam surface 32d is positioned away from the pin 40a of the lever 40. As soon as appropriate exposure is effected according to the luminosity of light from outside by the above-described circuit, the magnet 44 is de-energized in response to a shutter control signal produced by the first integrating circuit and the lever 40 is turned clockwise by the action of the spring 42, whereupon the pin 40c of the lever 40 gives a push on the cam surface 35b of the release lever 35. Consequently, the release lever 35 is turned counterclockwise, releasing the bent portion 37a of the sector operating lever 37. The lever 37 is turned counterclockwise by the spring 39 to close the sectors, completing a series of operations for the exposure. A projection 40d which is provided on the lever 40 is positioned such that it turns on the synchronous switch SY as the lever 40 releases the lever 37 (i.e., at the initial point of the sector closing action), thereby triggering a strobe in synchronism with the sector closing action. Namely, it is possible to compensate for a mechanical delay in the action responsive to the off-signal of the magnet.

Further, it is possible to correct the operational timing of the synchronous switch at large and small apertures by suitably correcting the contour of the cam surface 35b of the lever 35.

What is claimed is:

1. A flashmatic device for a camera equipped with a programmed shutter having sectors serving also as diaphragm blades and adapted to open the aperture gradually with the lapse of time, said flashmatic device comprising:

a flash device operative when triggered to emit light;

a delay circuit operative to start operation in synchronism with a shutter opening action to produce a first output signal at a delay time determined according to the subject distance, film sensitivity and intensity of light emitted from the flash device;

a synchronous switch operated by a movable shutter closing member during a shutter closing action to produce a second output signal;

a switching element connected to an output terminal of said delay circuit to receive therefrom the first output signal; and means for triggering said flash device by the first output signal of said delay circuit or by the second output signal of said synchronous switch whichever is produced earlier.

2. A flashmatic device as set forth in claim 1, wherein output terminals of said delay circuit and synchronous switch are connected to a control terminal of said switching element through a gate circuit.

3. A flashmatic device as set forth in claim 2, further comprising an indicator circuit including a D flip-flop having D- and C-inputs thereof connected respectively to an output terminal of said delay circuit where a subject distance signal appears and the output terminal of said synchronous switch, and Q- and $\overline{Q}$-output terminals thereof connected respectively to drive circuits of first and second display elements.

4. A flashmatic device as set forth in claim 1, further comprising an indicator circuit including a D flip-flop having D- and C-inputs thereof connected respectively to an output terminal of said delay circuit where a subject distance signal appears and the output terminal of said synchronous switch, and Q- and $\overline{Q}$-output terminals thereof connected respectively to drive circuits of first and second display elements.

5. In a camera having a shutter sector movable in opening and closing directions to define an aperture and an exposure interval, and movable sector opening and sector closing members movable in opening and closing directions to effect the opening and closing of the shutter sector respectively, a flashmatic device comprising: a flash device triggered by a trigger signal to irradiate light onto a subject to be photographed at a timing during the exposure interval; first control means initiated by the opening movement of the sector opening member for producing a first output signal at a delay time delayed from the initiation thereof and determined according to the subject distance; second control means including a switch element actuated by the closing movement of the sector closing member during the closing of the shutter sector for producing a second output signal; and trigger means for producing the trigger signal in response to the first or second output signal whichever is produced earlier.

6. A camera as set forth in claim 5; wherein the switch element comprises a synchronous switch for producing the second output signal in synchronization with the initial stage of closing movement of the shutter sector.

7. A camera as set forth in claim 5; wherein the sector closing member comprises a pivotal lever pivotably actuated by an electromagnet to effect the closing of the shutter sector.

8. A camera as set forth in claim 7; wherein the lever has a projection arranged such that the projection acts on the switch element when the lever initiates the closing of the shutter sector.

9. A camera as set forth in claim 5; wherein the first control means includes a first integrating circuit initiated by the sector opening member for producing a shutter control signal to initiate the closing movement of the shutter closing member at a delay time delayed from the initiation of the first integrating circuit and determined according to the subject brightness.

10. A camera as set forth in claim 9; wherein the first control means includes a second integrating circuit connected to the first integrating circuit and initiated by the sector opening member for producing the first output signal at a delay time delayed from the initiation thereof and determined according to the subject distance and the subject brightness.

11. A camera as set forth in claim 10; wherein second integrating circuit includes determining means for determining the delay time according to the subject distance and the subject brightness.

12. A camera as set forth in claim 11; wherein the determining means includes means for determining the delay time according to the film sensitivity of a film loaded in the camera.

13. A camera as set forth in claim 5; wherein the trigger means includes an OR-gate circuit for receiving the first and second output signals, and a SCR circuit connected to the OR-gate circuit for producing the trigger signal.

14. A camera as set forth in claim 5; including an indicator connected to the first and second control means for indicating whether the first output signal is produced earlier or later than the second output signal.

* * * * *